United States Patent
He

(10) Patent No.: US 11,330,631 B2
(45) Date of Patent: May 10, 2022

(54) REMOTE APPARATUS IN BASE STATION, BASE STATION, AND RANDOM ACCESS METHOD

(71) Applicant: HUAWEI TECHNOLOGIES CO., LTD., Guangdong (CN)

(72) Inventor: Jianping He, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 156 days.

(21) Appl. No.: 16/705,776

(22) Filed: Dec. 6, 2019

(65) Prior Publication Data

US 2020/0120716 A1 Apr. 16, 2020

Related U.S. Application Data

(63) Continuation of application No. PCT/CN2017/087813, filed on Jun. 9, 2017.

(51) Int. Cl.
*H04W 74/08* (2009.01)
*H04L 1/18* (2006.01)
(Continued)

(52) U.S. Cl.
CPC ....... *H04W 74/0833* (2013.01); *H04L 1/1812* (2013.01); *H04L 5/0055* (2013.01);
(Continued)

(58) Field of Classification Search
None
See application file for complete search history.

(56) References Cited

U.S. PATENT DOCUMENTS

2012/0140648 A1* 6/2012 Bejerano ............. H04L 12/1868
370/252
2013/0258926 A1* 10/2013 Osakada ............... H04W 52/04
370/311
(Continued)

FOREIGN PATENT DOCUMENTS

CN 102316055 A 1/2012
CN 103379071 A 10/2013
(Continued)

OTHER PUBLICATIONS

3GPP TS 36.321 V14.2.1 (Mar. 2017),3rd Generation Partnership Project;Technical Specification Group Radio Access Network;Evolved Universal Terrestrial Radio Access (E-UTRA);Medium Access Control (MAC) protocol specification (Release 14),total 102 pages.
(Continued)

*Primary Examiner* — Ayanah S George
(74) *Attorney, Agent, or Firm* — Womble Bond Dickinson (US) LLP

(57) ABSTRACT

This application discloses a remote apparatus, a base station, a random access method, a storage medium, and a program product, and relates to the field of communications technologies. The remote apparatus includes a radio frequency apparatus and a baseband apparatus, where the baseband apparatus is configured to perform partial or total physical layer protocol processing on data of UE, and respond to a random access preamble sent by the UE. In this application, after receiving the random access preamble of the UE, the remote apparatus may directly respond to the random access preamble by using the baseband apparatus, and does not need to send the random access preamble to a centralized control apparatus, so that the centralized control apparatus responds to the random access preamble.

16 Claims, 6 Drawing Sheets

(51) Int. Cl.
*H04L 5/00* (2006.01)
*H04W 52/24* (2009.01)
*H04W 72/12* (2009.01)
*H04W 74/00* (2009.01)

(52) U.S. Cl.
CPC ..... *H04W 52/242* (2013.01); *H04W 72/1268* (2013.01); *H04W 74/006* (2013.01)

(56) References Cited

U.S. PATENT DOCUMENTS

| | | | |
|---|---|---|---|
| 2014/0177607 A1* | 6/2014 | Li | H04W 52/42 370/336 |
| 2014/0307688 A1* | 10/2014 | Nagata | H04L 5/0035 370/329 |
| 2016/0330056 A1 | 11/2016 | Wang et al. | |
| 2017/0311201 A1* | 10/2017 | Uchino | H04W 28/04 |
| 2018/0279182 A1* | 9/2018 | Sang | H04W 74/0833 |
| 2018/0302865 A1* | 10/2018 | Liu | H04W 52/50 |

FOREIGN PATENT DOCUMENTS

| | | | |
|---|---|---|---|
| CN | 103731884 A | 4/2014 | |
| CN | 104768165 A | 7/2015 | |
| CN | 105227280 A | 1/2016 | |
| CN | 106301444 A | 1/2017 | |
| EP | 2206253 B1 | 9/2015 | |
| EP | 3468284 A1 * | 4/2019 | ............ H04W 74/02 |
| EP | 3468284 A1 | 4/2019 | |
| WO | 2015113274 A1 | 8/2015 | |
| WO | 2016189916 A1 | 12/2016 | |

OTHER PUBLICATIONS

3GPP TS 36.331 V14.2.2 (Apr. 2017);3rd Generation Partnership Project;Technical Specification Group Radio Access Network;Evolved Universal Terrestrial Radio Access (E-UTRA);Radio Resource Control (RRC);Protocol specification (Release 14);total 721 pages.

* cited by examiner

REMOTE APPARATUS IN BASE STATION, BASE STATION, AND RANDOM ACCESS METHOD

CROSS-REFERENCE TO RELATED APPLICATIONS

This application is a continuation of International Patent Application No. PCT/CN2017/087813, filed on Jun. 9, 2017, the disclosure of which is hereby incorporated by reference in its entirety.

TECHNICAL FIELD

This application relates to the field of communications technologies, and in particular, to a remote apparatus in a base station, a base station, and a random access method.

BACKGROUND

Generally, a communications system includes a base station, and the base station is configured to provide a service such as radio resource scheduling, radio resource management, mobility, handover, and admission control for user equipment (UE) within coverage of the base station. In addition, the base station is further responsible for selecting a core network device that serves the UE. The base station may provide a random access service for the UE. To be specific, when the UE attempts to access a mobile communications network, the base station may receive a random access preamble sent by the UE, and return a random access response to the UE, so that the UE successfully accesses the mobile communications network based on the random access response.

To facilitate deployment and reduce costs, a current base station usually includes a centralized control apparatus and at least one remote apparatus, and provides the random access service for the UE by using both the centralized control apparatus and the remote apparatus. The centralized control apparatus is connected to each remote apparatus by using a common public radio interface (CPRI) specification. According to the CPRI specification, specific function division needs to be performed on the centralized control apparatus and the remote apparatus. To be specific, the centralized control apparatus is mainly responsible for processing a baseband signal, and the remote apparatus includes a radio frequency apparatus, and may be responsible for processing such as signal filtering, digital-analog signal/analog-digital signal (DA/AD) conversion, signal frequency conversion, and amplification. FIG. 1 is a schematic structural diagram of a typical base station. As shown in FIG. 1, the base station includes one centralized control apparatus 10 and three remote apparatuses 20. The three remote apparatuses may serve three cells, and the centralized control apparatus 10 is connected to each remote apparatus 20 by using the CPRI specification. According to a current interface specification and function division of the centralized control apparatus and the remote apparatus in the base station, in a procedure in which the base station provides the random access service, after the UE sends the random access preamble to the base station, the centralized control apparatus in the base station forwards the random access response to the UE by using the remote apparatus.

However, with development of the communications system, large-scale centralized deployment of centralized control apparatuses is gradually required. Consequently, a transmission latency between the remote apparatus and the centralized control apparatus increases. In addition, a related protocol of the communications system imposes a strict requirement on a latency of random access. To be specific, after the UE sends the random access preamble to the base station, the UE needs to receive the random access response within a required relatively short latency; otherwise, it is determined that the random access fails. Consequently, when the transmission latency between the remote apparatus and the centralized control apparatus is relatively long, the base station may not be capable of responding to the random access response in time. In this case, the base station cannot provide the random access service.

SUMMARY

To resolve a problem in a related technology that service processing fails because a base station cannot return a service response to UE in time when a transmission latency between a centralized control apparatus and a remote apparatus is relatively long, this application provides a remote apparatus in a base station, a base station, and a random access method. The technical solutions are as follows:

According to a first aspect, a remote apparatus in a base station is provided. The base station includes a centralized control apparatus, and the centralized control apparatus is connected to the remote apparatus and is configured to process data of UE that accesses the base station. The remote apparatus includes a radio frequency apparatus and a baseband apparatus. The baseband apparatus is configured to: perform partial or total physical layer protocol processing on the data of the UE, and respond to a random access preamble sent by the UE. By using the baseband apparatus included in the remote apparatus, the remote apparatus may directly respond to the random access preamble sent by the UE, and does not need to send the random access preamble to the centralized control apparatus, so that the centralized control apparatus responds to the random access preamble. In this way, a transmission latency between the remote apparatus and the centralized control apparatus is avoided, and a remote apparatus can return the random access response to the UE in time.

In a possible embodiment, the baseband apparatus is configured to send a first random access response (RAR) message to the UE. In other words, the remote apparatus does not need to interact with the centralized control apparatus, and may directly generate, by using the baseband apparatus, a first RAR message based on the received random access preamble, and send the first RAR message to the UE. In this way, random access responding efficiency is improved.

In a possible embodiment, the baseband apparatus is configured to: receive a second RAR message from the centralized control apparatus, generate a first RAR message based on the second RAR message, and send the first RAR message to the UE. In other words, the remote apparatus may first interact with the centralized control apparatus, and then generate the first RAR message based on the second RAR message received from the centralized control apparatus. In this manner, a function of the remote apparatus may be simplified.

In a possible embodiment, the baseband apparatus is further configured to: receive an uplink scheduling transmission message sent by the UE, and send a contention resolution message to the UE based on the uplink scheduling transmission message. In other words, the uplink scheduling transmission message and the contention resolution message may also be processed in the remote apparatus. In this way, random access performance of the base station when the transmission latency between the remote apparatus and the centralized control apparatus is relatively long is further ensured.

In a possible embodiment, the baseband apparatus is further configured to: receive an uplink scheduling transmission message sent by the UE, send the uplink scheduling transmission message to the centralized control apparatus, receive a contention resolution message sent by the centralized control apparatus, and send the contention resolution message to the UE. In other words, the uplink scheduling transmission message and the contention resolution message may also be processed in the centralized control apparatus. In this way, flexibility of random access processing is improved.

In a possible embodiment, the baseband apparatus is configured to send the first RAR message to the UE on a first frequency domain resource, where the first frequency domain resource is a frequency domain resource allocated by the centralized control apparatus or the baseband apparatus.

In a possible embodiment, the baseband apparatus is further configured to: buffer first downlink data; and after the centralized control apparatus sends the first downlink data by using the remote apparatus, if a negative acknowledgment (NACK) message is received, send the buffered first downlink data to the UE. In this way, a transmission policy of downlink data is optimized by using the remote apparatus. This effectively resolves a problem that spectrum efficiency significantly decreases because hybrid automatic repeat request (HARQ) retransmission of the downlink data cannot be implemented when the transmission latency between the remote apparatus and the centralized control apparatus is relatively long. In this way, efficient and reliable transmission when the transmission latency between the remote apparatus and the centralized control apparatus is relatively long is implemented.

In a possible embodiment, the baseband apparatus is further configured to: receive first uplink data sent by the UE; determine channel quality between the base station and the UE; and determine, based on the channel quality, whether the UE retransmits the first uplink data.

In a possible embodiment, the baseband apparatus is configured to perform total physical layer protocol processing on the data of the UE, and the baseband apparatus is further configured to: receive the first uplink data sent by the UE; decode the first uplink data; and determine, based on a decoding result, whether the UE retransmits the first uplink data.

In a possible embodiment, the baseband apparatus is further configured to: receive scheduling resource information sent by the centralized control apparatus; and if the baseband apparatus determines that the UE needs to retransmit the first uplink data, send a NACK message to the UE; or if the baseband apparatus determines that the UE does not need to retransmit the first uplink data, send an acknowledgement (ACK) message and the scheduling resource information to the UE, to instruct the UE to transmit second uplink data on a resource indicated by the scheduling resource information.

In the foregoing methods, a transmission policy of uplink data is optimized by using the remote apparatus. This effectively resolves a problem that spectrum efficiency significantly decreases because HARQ retransmission of the uplink data cannot be implemented when the transmission latency between the remote apparatus and the centralized control apparatus is relatively long. In this way, efficient and reliable transmission when the transmission latency between the remote apparatus and the centralized control apparatus is relatively long is implemented.

According to a second aspect, a base station is provided. The base station includes a centralized control apparatus and any remote apparatus connected to the centralized control apparatus according to the first aspect. The centralized control apparatus is configured to process data of UE that accesses the base station. The data of the UE may be processed and be sent to the remote apparatus by the centralized control apparatus, to be sent to the UE by using the remote apparatus. Alternatively, the data of the UE is received by the remote apparatus from the UE, and is sent to the centralized control apparatus for processing.

In a possible embodiment, the centralized control apparatus is further configured to: send first downlink data to the UE by using the remote apparatus; and if no ACK message or NACK message is received within a preset time interval, send second downlink data to the UE by using the remote apparatus; or if a NACK message is received, retransmit the first downlink data to the UE by using the remote apparatus. A transmission policy of downlink data is optimized by using the centralized control apparatus. This effectively resolves a problem that spectrum efficiency significantly decreases because HARQ retransmission of the downlink data cannot be implemented when the transmission latency between the remote apparatus and the centralized control apparatus is relatively long. In this way, efficient and reliable transmission when the transmission latency between the remote apparatus and the centralized control apparatus is relatively long is implemented.

In a possible embodiment, the centralized control apparatus is further configured to: determine a path loss between the base station and the UE; and determine, based on the path loss, whether the UE needs to retransmit uplink data.

In a possible embodiment, the centralized control apparatus is further configured to determine, based on a historical channel quality detection result between the base station and the UE and a historical cyclic redundancy check (CRC) result of the uplink data, whether the UE needs to retransmit the uplink data.

In a possible embodiment, if the centralized control apparatus determines that the UE needs to retransmit the uplink data, the centralized control apparatus is further configured to send a NACK message to the UE; or if the centralized control apparatus determines that the UE does not need to retransmit the uplink data, the centralized control apparatus is further configured to send an ACK message and scheduling resource information to the UE, to instruct the UE to transmit the uplink data on a resource indicated by the scheduling resource information.

In the foregoing methods, a transmission policy of the uplink data is optimized by using the centralized control apparatus. This effectively resolves a problem that spectrum efficiency significantly decreases because HARQ retransmission of the uplink data cannot be implemented when the transmission latency between the remote apparatus and the centralized control apparatus is relatively long. In this way, efficient and reliable transmission when the transmission latency between the remote apparatus and the centralized control apparatus is relatively long is implemented.

In a possible embodiment, the centralized control apparatus is further configured to determine, based on the transmission latency, whether the remote apparatus responds to a random access preamble. By determining, based on the transmission latency, whether the remote apparatus responds to the random access preamble, flexibility and accuracy of responding to the random access preamble by the base station are improved.

According to a third aspect, a random access method is provided. The random access method may be implemented by any remote apparatus provided in the first aspect or by any base station provided in the second aspect.

According to a fourth aspect, a computer readable storage medium is provided. The computer readable storage medium stores an instruction, and when the instruction is run on a computer, the computer is enabled to perform the random access method according to the third aspect.

According to a fifth aspect, a computer program product that includes an instruction is provided. When the computer program product is run on a computer, the computer is enabled to perform the random access method according to the third aspect.

Technical effects achieved in the third aspect, the fourth aspect, and the fifth aspect are similar to a technical effect achieved by a corresponding technical method according to the first aspect or the second aspect. Details are not described herein again.

The technical solutions provided in this application bring the following beneficial effects:

In the embodiments of the present invention, the remote apparatus in the base station is provided. The remote apparatus includes not only the radio frequency apparatus, but also the baseband apparatus that is configured to perform partial or total physical layer protocol processing on the data of the UE and that is configured to respond to the random access preamble sent by the UE. Therefore, after receiving the random access preamble of the UE, the remote apparatus may directly respond to the random access preamble by using the baseband apparatus, and does not need to send the random access preamble to the centralized control apparatus, so that the centralized control apparatus responds to the random access preamble. In this way, the transmission latency between the remote apparatus and the centralized control apparatus may be avoided, and the remote apparatus returns the random access response to the UE in time.

DESCRIPTION OF EMBODIMENTS

Figure 1:
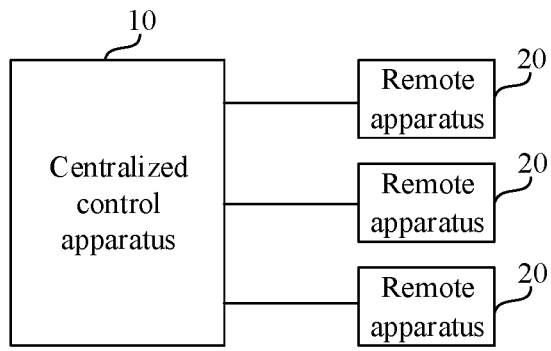
FIG. 1 is a schematic structural diagram of a typical base station.

The technical solutions according to embodiments of the present invention are clearly and described in the following with reference to the accompanying drawings. Apparently, the described embodiments are merely some but not all of the embodiments of this application. All other embodiments obtained by a person of ordinary skill in the art based on the embodiments of this application without creative efforts shall fall within the protection scope of the present invention.

The network architecture and the service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that with the evolution of the network architecture and the emergence of new service scenarios, the technical solutions provided in the embodiments of the present invention are also applicable to similar technical problems.

A technology described in this application is applicable to a communications system. The communications system includes a base station and UE. The base station and the UE may communicate with each other by using a wireless communications network.

The communications system to which this application is applicable may be a long term evolution (LTE) system or other wireless communications systems that use various radio access technologies, for example, systems that use access technologies such as code division multiple access, frequency division multiple access, time division multiple access, orthogonal frequency division multiple access, and single carrier frequency division multiple access. In addition, the system may further be a subsequent evolved system of an LTE system, such as a fifth generation (5G) system.

The UE in this application may include a handheld device, a vehicle-mounted device, a wearable device, or a computing device having a wireless communication function, another processing device connected to a wireless modem, UE in various forms, a mobile station (MS), a terminal, terminal equipment, or the like. For ease of description, in this application, the foregoing devices are collectively referred to as user equipment or UE.

The base station (BS) in this application is an apparatus that is deployed in a radio access network and that is configured to provide a wireless communication function for the UE. The base station may include various forms of macro base stations, micro base stations, relay stations, access points, distributed base stations, and the like. In systems that use different radio access technologies, a device with a base station function may have different names. For example, in an LTE network, a device with the base station function is referred to as an evolved NodeB (referred to herein as a NodeB, eNB or eNodeB); in a 3rd generation (3G) network, the device is referred to as a NodeB; and the like. For ease of description, in this application, the foregoing apparatuses that provide a wireless communication function for the UE are collectively referred to as a base station or BS.

In this application, terms "network" and "system" are frequently interchangeably used, but a person skilled in the art may understand meanings of the terms. "/" in this application means "and" and "or". For example, "A/B" may include "A", "B", and "A and B".

Figure 2:
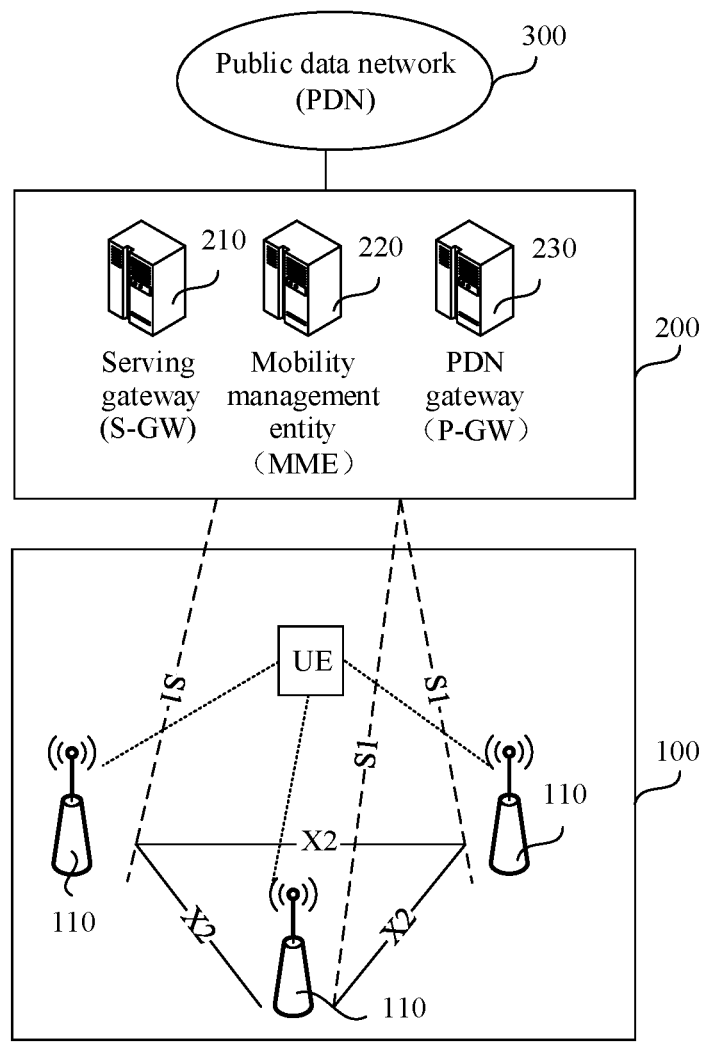
FIG. 2 is a schematic diagram of a network architecture of a communications system according to an embodiment of the present invention.

FIG. 2 is a schematic diagram of a network architecture of a communications system according to an embodiment of the present invention. As shown in FIG. 2, the communications system includes an evolved universal terrestrial radio access network (E-UTRAN) 100, evolved packet core (EPC) 200, and a packet data network (PDN) 300. The E-UTRAN 100 serves as a radio access network, the EPC 200 serves as a core network, and the UE accesses the PDN 300 by using the E-UTRAN and the EPC.

The E-UTRAN 100 includes a plurality of base stations 110 that support communication with the UE. The UE may be a mobile phone, an intelligent digital device, or the like. The EPC 200 includes a serving gateway (S-GW) 210, a mobility management entity (MME) MME 220, and a PDN gateway (P-GW) 230. The PDN is a wide area network established by a telecom operator, and is used to provide a high-quality data transmission service for a subscriber. In actual application, the UE may be connected to the EPC 200 by using the base station 110, and further may be connect to the PDN 300. The EPC 200 and the PDN 300 may work together to provide a connection service and a mobility service for the UE.

The E-UTRAN 100 includes the plurality of base stations 110. The base stations 110 are interconnected by using an X2 interface, and the X2 interface is configured to transmit information about load, interference, and handover. The UE communicates with the base station 110 by using a radio air interface (that is, LTE-uu). The air interface may carry various protocols, such as a radio resource control (RRC) signaling control protocol between the UE and the base station 110, and a non-access stratum (NAS) signaling control protocol between the UE and the MME. The base station 110 communicates with the EPC 200 by using an S1 interface. The S1 interface may be divided into two sub interfaces: a control plane interface S1-C and a user plane interface S1-U.

Figure 3:
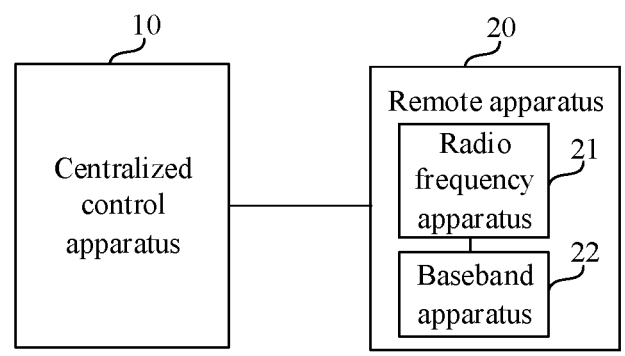
FIG. 3 is a schematic structural diagram of a base station according to an embodiment of the present invention.

The following describes a base station in an embodiment of the present invention with reference to FIG. 3. As shown in FIG. 3, the base station includes a centralized control apparatus 10 and a remote apparatus 20 connected to the centralized control apparatus. There may be one or more remote apparatuses connected to the centralized control apparatus. In FIG. 3, an example in which only one remote apparatus is connected to the centralized control apparatus is used for description.

The centralized control apparatus 10 is configured to process data of a UE that accesses the base station. The data of the UE may be processed and be sent to the remote apparatus 20 by the centralized control apparatus 10, to be sent to the UE by using the remote apparatus 20. For example, downlink data may be sent to the UE. Alternatively, the data of the UE is received by the remote apparatus 20 from the UE, and is sent to the centralized control apparatus 10 for processing. For example, uplink data sent by the UE may be received. The centralized control apparatus is an apparatus that is in the base station and that is responsible for processing a baseband signal. In actual application, the centralized control apparatus may be referred to as a digital unit (DU), a baseband unit (BBU), a radio equipment control (REC) unit, a baseband processing unit (BPU), or the like.

The remote apparatus 20 includes a radio frequency apparatus 21 and a baseband apparatus 22. The baseband apparatus 22 is configured to: perform partial or total physical layer protocol processing on the data of the UE, and respond to a random access preamble sent by the UE. The remote apparatus is an apparatus that is in the base station and that is responsible for processing such as signal filtering, DA/AD conversion, signal conversion, and amplification. In actual application, the remote apparatus may be referred to as a radio frequency unit (RU), a remote radio unit (RRU), a remote radio head (RRH), a radio equipment (RE), or the like.

The radio frequency (RF) apparatus may include an RF transmitting module and an RF receiving module. The RF transmitting module is configured to complete downlink signal filtering, D/A conversion, up-conversion on a radio frequency signal to a transmit frequency band, and the like. The RF receiving module is configured to: receive a radio frequency signal by using an antenna, perform down-conversion on a received radio frequency signal to an intermediate frequency band, and perform amplification processing, A/D conversion, and the like. Optionally, the RF apparatus may be an intermediate radio frequency (IRF) apparatus or the like configured to process an intermediate frequency band signal.

For ease of understanding this application, the following describes protocols of each layer that are processed by the base station. In addition to the RF apparatus, functions of the base station may usually be classified into three layers: a layer 1 (L1), a layer 2 (L2), and a layer 3 (L3).

The L1 layer includes protocols used to process channel coding/channel decoding, rate matching/rate de-matching, channel interleaving and de-interleaving, scrambling/descrambling, modulation/demodulation, layer mapping/demapping, precoding/MIMO decoding, RE mapping and demapping, adding of a cyclic prefix (CP)/removing of a CP, and the like. The L2 layer includes a packet data convergence protocol (PDCP), a radio link control (RLC) protocol, a media access control (MAC) protocol, and the like. The L3 layer includes a radio resource control (RRC) protocol, and protocols used to perform dynamic resource allocation, measurement configuration, radio admission control, mobility management, and radio resource management (RRM), and the like.

In the prior art, a remote apparatus in a base station includes an RF apparatus, and a centralized control apparatus includes an L1 module, an L2 module, and an L3 module. The L1 module is configured to process layer 1 protocols, that is, all physical layer protocols, the L2 module is configured to process layer 2 protocols, and the L3 module is configured to process layer 3 protocols. In the prior art, the remote apparatus includes only the RF apparatus, and the RF apparatus does not have functions of processing a random access preamble and generating a random access response (RAR) message. Therefore, after receiving a random access preamble sent by UE, the remote apparatus in the prior art further needs to forward the random access preamble to the centralized control apparatus, and the centralized control apparatus processes and responds to the random access preamble. After processing, the centralized control apparatus sends, to the UE by using the remote apparatus, a RAR message obtained by processing. In other words, a transmission latency between the remote apparatus and the centralized control apparatus may occur in a random access processing process.

In an embodiment of the present invention, to resolve a problem that a base station cannot reply with a RAR message in time when a transmission latency between a remote apparatus and a centralized control apparatus is relatively long, an interface position adjusting method is provided. By using the interface position adjusting method, a position of an interface of the base station may be adjusted, so that functions of the remote apparatus and the centralized control apparatus are re-divided.

In other words, in this embodiment of the present invention, a remote apparatus in a base station is provided. The remote apparatus includes a radio frequency apparatus and a baseband apparatus. The baseband apparatus is configured to: perform partial or total physical layer protocol processing on data of UE, and respond to a random access preamble sent by the UE. In other words, the remote apparatus may directly respond to the received random access preamble by using the baseband apparatus included in the remote apparatus, and does not need to forward the random access preamble to a centralized control apparatus for processing. In this way, a transmission latency between the centralized control apparatus and the remote apparatus is avoided.

In a possible embodiment, the base station includes the centralized control apparatus and the remote apparatus, and the remote apparatus includes an RF apparatus and the baseband apparatus.

Optionally, the baseband apparatus includes an L1' module. The L1' module is configured to: perform partial physical layer protocol processing on the data of the UE, and respond to the random access preamble sent by the UE.

The L1' module may include a random access channel (RACH) detection module and a physical downlink shared channel (PDSCH) processing module, or may include a RACH detection module, a physical downlink control channel (PDCCH) processing module, and a PDSCH processing module. The RACH detection module is configured to: detect a random access channel; and obtain a random access preamble transmitted on the random access channel. The PDSCH processing module is configured to perform processing such as coding, modulation, and layer mapping and precoding on a PDSCH channel, and, may include a PDSCH coding module, a PDSCH modulation module, a PDSCH layer mapping and precoding module, and the like. The PDCCH processing module is configured to perform processing such as coding, modulation, and layer mapping and precoding on a PDCCH channel, and, may include a PDCCH coding module, a PDCCH modulation module, a PDCCH layer mapping and precoding module, and the like.

Optionally, the baseband apparatus includes the foregoing L1' module and an L2' module. The L1' module is configured to perform partial physical layer protocol processing on the data of the UE, and the L2' module is configured to perform partial layer 2 protocol processing on the data of the UE. The baseband apparatus may respond, by using the L1' module and the L2' module, to the random access preamble sent by the UE.

The L2' module may be configured to perform resource allocation, and optionally, may be a resource allocation module. For example, the L2' module may allocate a resource to a to-be-sent RAR message, or allocate a resource to each of a RAR message and an uplink scheduling transmission message. Optionally, the L2' module may be an L2 agent (agent), and the L2 agent has a resource allocation function.

Optionally, the baseband apparatus includes an L1 module. The L1 module is configured to: perform total physical layer protocol processing on the data of the UE, and respond to the random access preamble sent by the UE.

The L1 module may include a coding module, a modulation module, a layer mapping and precoding module, a decoding module, a demodulation module, an equalization and channel estimation module, and the like, and is configured to perform processing such as coding and modulation on all channels.

Optionally, the baseband apparatus includes the L1 module and the L2' module. For the L1 module and the L2' module, refer to the foregoing related description. Details are not described herein again.

Optionally, the baseband apparatus may include a physical hybrid automatic repeat request indicator channel (PHICH) processing module, and is configured to feed back an ACK message or a NACK message to the UE by using the PHICH processing module.

Optionally, the centralized control apparatus may include the L1 module, an L2 module, and an L3 module. The L1 module is configured to process layer 1 protocols, the L2 module is configured to process layer 2 protocols, and the L3 module is configured to process layer 3 protocols.

Optionally, the centralized control apparatus may alternatively include the L2 module and the L3 module.

Figure 4:
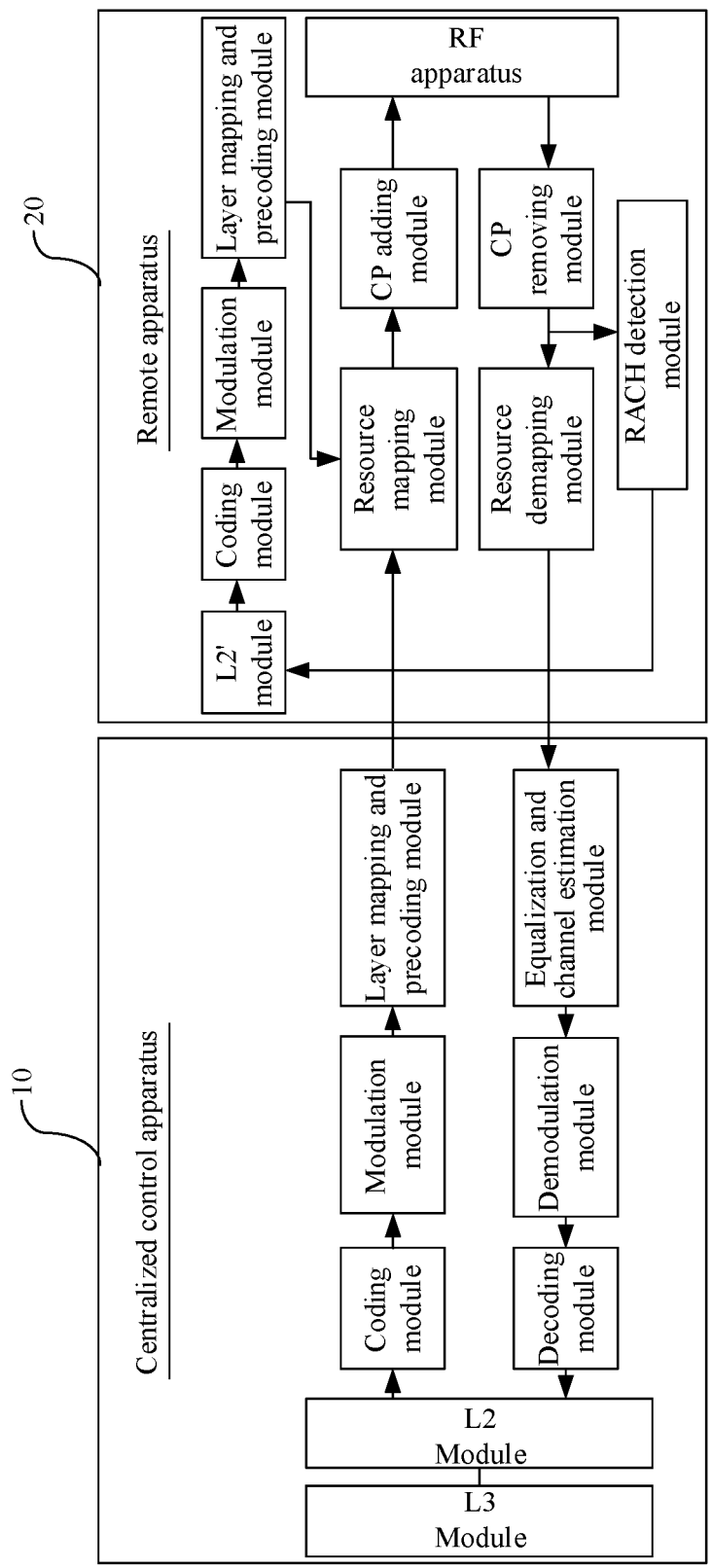
FIG. 4 is a schematic structural diagram of another base station according to an embodiment of the present invention.

In an example, referring to FIG. 4, a base station includes a centralized control apparatus 10 and a remote apparatus 20. The centralized control apparatus 10 includes an L3 module, an L2 module, a coding module, a modulation module, a layer mapping and precoding module, a decoding module, a demodulation module, an equalization and channel estimation module. The remote apparatus 20 includes an RF apparatus, an L2' module, a RACH detection module, a coding module, a modulation module, a layer mapping and precoding module, a resource mapping module, a CP adding module, a resource demapping module, and a CP removing module.

The coding module, the modulation module, the layer mapping and precoding module in the remote apparatus 20 are configured to process a PDSCH, or are configured to process a PDCCH and a PDSCH. The coding module, the modulation module, the layer mapping and precoding module, the decoding module, the demodulation module, the equalization and channel estimation module in the centralized control apparatus 10 are configured to process all channels.

Figure 5:
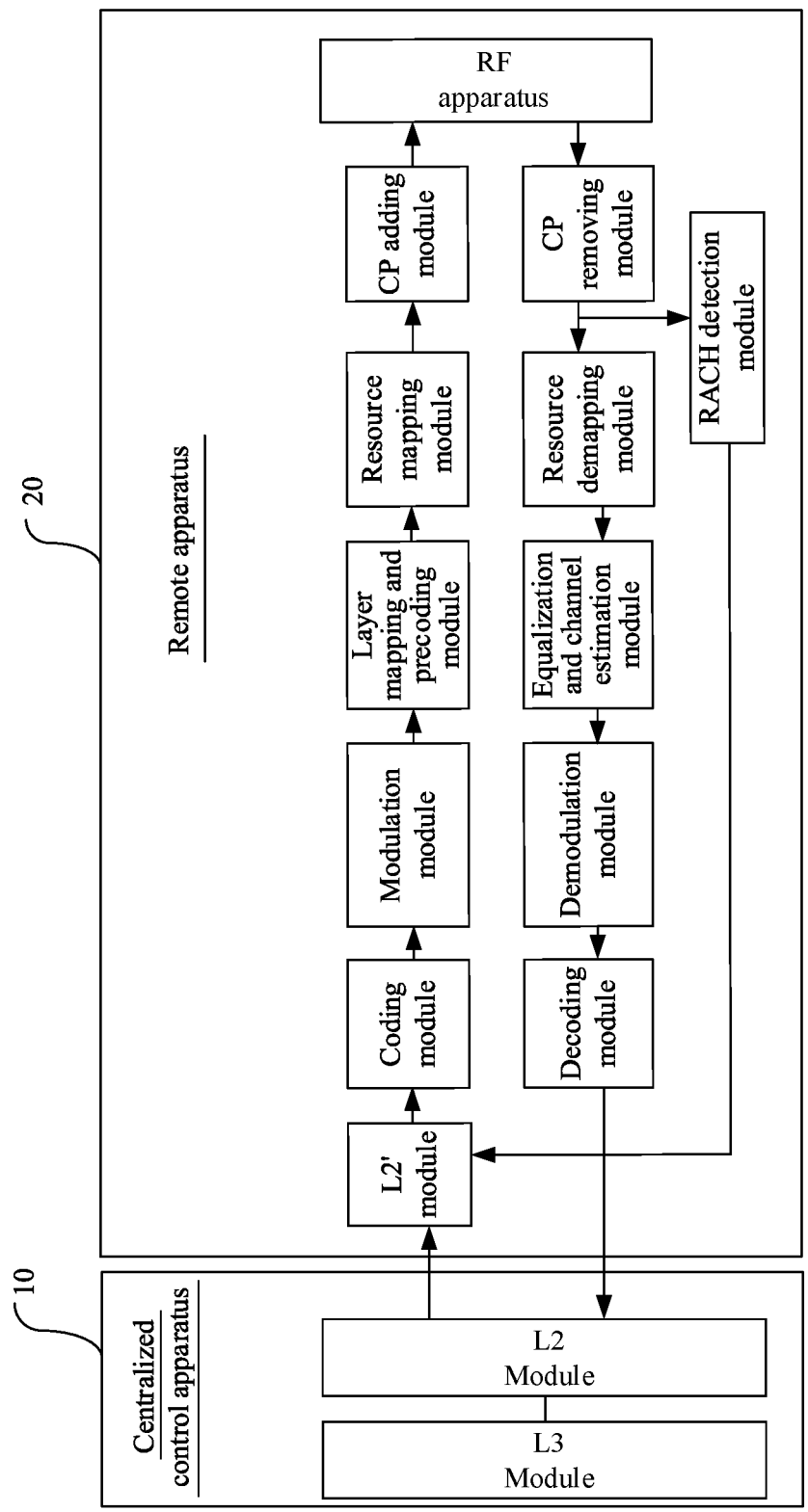
FIG. 5 is a schematic structural diagram of still another base station according to an embodiment of the present invention.

In an example, referring to FIG. 5, a base station includes a centralized control apparatus 10 and a remote apparatus 20. The centralized control apparatus 10 includes an L3 module and an L2 module. The remote apparatus 20 includes an RF apparatus, an L2' module, a RACH detection module, a coding module, a modulation module, a layer mapping and precoding module, a resource mapping module, a CP adding module, a decoding module, a demodulation module, an equalization and channel estimation module, a resource demapping module, and a CP removing module.

The coding module, the modulation module, the layer mapping and precoding module, the resource mapping module, the CP adding module, the decoding module, the demodulation module, the equalization and channel estimation module, the resource demapping module, and the CP removing module in the remote apparatus 10 may process all channels.

Based on common aspects of the foregoing embodiments of the present invention, the following further describes in detail a remote apparatus provided in an embodiment of the present invention.

The remote apparatus provided in this embodiment of the present invention includes a radio frequency apparatus and a baseband apparatus. The baseband apparatus is configured to: perform partial or total physical layer protocol processing on data of UE, and respond to a random access preamble sent by the UE.

Optionally, the baseband apparatus is configured to send a first random access response RAR message to the UE.

To be specific, the baseband apparatus may directly process the received random access preamble sent by the UE, to generate a first RAR message, and send the first RAR message to the UE. In this way, the remote apparatus may directly respond, by using the pre-deployed baseband apparatus and without interacting with a centralized control apparatus, to the random access preamble sent by the UE, and send the first RAR message to the UE. Therefore, a transmission latency between the centralized control apparatus and the remote apparatus is avoided, and a RAR message can be returned to the UE in time.

For the RAR message to the random access preamble, the RAR message usually includes timing advance (TA), resource allocation information (UL grant) of an uplink scheduling transmission message, a user temporary identifier (TC-RNTI) allocated to the UE that sends the random access preamble, and an ID of the random access preamble ID (RAPID). Therefore, the processing, by the baseband apparatus, the random access preamble sent by the UE, to generate a first RAR message may include: detecting, by the baseband apparatus, the random access preamble sent by the UE, to obtain the TA and the ID that is carried in the random access preamble, where the ID of the random access preamble is the RAPID; allocating, by the baseband apparatus, a resource to the uplink scheduling transmission message of the UE to obtain the UL grant; allocating a user temporary identifier to the UE, to obtain the TC-RNTI; and generating the first RAR message based on the RAPID, the TA, the UL grant, and the TC-RNTI.

Optionally, the baseband apparatus may allocate the UL grant and the TC-RNTI to the UE by using a pre-deployed L2' module, and the baseband apparatus may send the first RAR message to the UE by using a pre-deployed L1' module or an L1 module.

A remote apparatus 20 shown in FIG. 4 or FIG. 5 is used as an example. After receiving a random access preamble sent by the UE on a random access channel, the remote apparatus 20 may directly detect the random access preamble, to obtain TA and a RAPID, allocate a UL grant and a TC-RNTI to the UE by using an L2' module, and then send a first RAR message to the UE based on the obtained TA, the obtained RAPID, the UL grant and the TC-RNTI.

The uplink scheduling transmission message is a message sent by the UE to the base station after receiving the RAR message returned by the base station. In addition, after receiving the uplink scheduling transmission message sent by the UE, the base station returns a contention resolution message to the UE. A random access procedure may be completed after the UE receives the contention resolution message. To be specific, the random access procedure between the UE and the base station includes: The UE sends the random access preamble (Random Access Preamble) to the base station; the base station returns the RAR message to the UE; the UE sends the uplink scheduling transmission message to the base station; the base station sends the contention resolution message to the UE. For ease of description, in the following, the random access preamble is referred to as a message 1 (Msg 1), the RAR message is referred to as a message 2 Msg 2), the uplink scheduling transmission message is referred to as a message 3 (Msg 3), and the contention resolution message is referred to as a message 4 (Msg 4).

Optionally, the baseband apparatus is further configured to receive a second RAR message from the centralized control apparatus, and the baseband apparatus is configured to generate a first RAR message based on the second RAR message; and send the first RAR message to the UE.

For ease of description, a random access preamble currently received by the baseband apparatus may be referred to as a first random access preamble, and a random access preamble sent by the UE before sending the first random access preamble is referred to as a second random access preamble.

In an example, the second RAR message may be a RAR message generated by the centralized control apparatus in response to the second random access preamble. The baseband apparatus may generate the first RAR message based on the second RAR message and the first random access preamble.

To be specific, the UE may first send the second random access preamble to the remote apparatus, the remote apparatus may send, according to a conventional procedure, the second random access preamble to the centralized control apparatus, so that the centralized control apparatus responds to the random access preamble, and receive the second RAR message sent by the centralized control apparatus. In this case, a transmission latency between the centralized control apparatus and the remote apparatus may occur in a processing process of the second RAR message. Therefore, to avoid that a time of sending the second RAR message to the UE exceeds a receiving deadline of the second RAR message, the remote apparatus may not send the second RAR message to the UE, but to buffer the second RAR message first. After receiving the random access preamble again, that is, the first random access preamble sent by the UE, the remote apparatus generates the first RAR message based on the buffered second RAR message and the first random access preamble.

Optionally, the baseband apparatus may replace TA and a RAPID in the second RAR message based on the first random access preamble, to obtain the first RAR message. For example, the second RAR message includes TA 2, a UL grant, a TC-RNTI, and a RAPID 2. The TA 2 is TA obtained by the centralized control apparatus by performing detection based on the second random access preamble, and the RAPID 2 is an ID of the second random access preamble. After receiving the first random access preamble sent by the UE, the remote apparatus may detect the first random access preamble to obtain TA 1 and an RAPID 1, and then replace the TA 2 and the RAPID 2 in the second RAR message with the TA 1 and the RAPID 1, to obtain the first RAR message.

Figure 6:
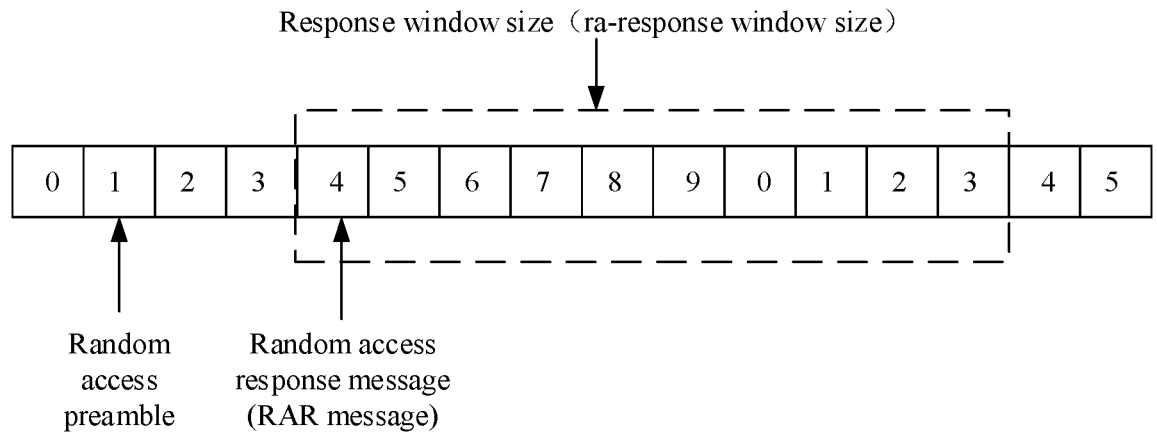
FIG. 6 is a schematic diagram of a receiving time of a RAR message according to an embodiment of the present invention.

A receiving deadline of a RAR message may be determined based on a response window size (ra-Response Window Size). The response window size is a time period within which the UE is allowed to receive the RAR message after sending the random access preamble. The time period may be set according to a protocol. For example, referring to FIG. 6, the UE sends a random access preamble in the first subframe, and the UE starts to receive a RAR message from the third subframe after sending the random access preamble. The receiving deadline of the RAR message is determined based on the ra-ResponseWindowSize, and a maximum ra-ResponseWindowSize is 10 ms. Therefore, the UE needs to receive a correct RAR message in 13 ms at latest after sending the random access preamble. Otherwise, random access of the UE fails.

In another example, the second RAR message may be a RAR message pre-scheduled by the centralized control apparatus within the response window size of the random access preamble. The baseband apparatus may generate the first RAR message based on the second RAR message and the random access preamble.

To be specific, the centralized control apparatus may schedule a preset quantity of RAR messages for the random access preamble in advance based on a sending period of the random access preamble and within a response window size of the random access preamble sent in each period, and send the one or more scheduled RAR messages to the remote apparatus, and the baseband apparatus in the remote apparatus buffers the one or more scheduled RAR messages. After receiving the random access preamble sent by the UE, the baseband apparatus in the remote apparatus generates the first RAR message based on the second RAR message and the random access preamble.

The preset quantity may be dynamically set based on a quantity of UEs currently served by the base station, in other words, may be set based on service load. For example, when there are a relatively large quantity of served UEs, a relatively large quantity of second RAR messages may be scheduled; or when there are a relatively small quantity of served UEs, a relatively small quantity of second RAR messages may be scheduled.

The second RAR message may carry blank TA and a blank RAPID. The baseband apparatus may replace, based on the random access preamble, the blank TA and the blank RAPID that are included in the buffered second RAR message, to generate the first RAR message. For example, a TA field and a RAPID field in the second RAR message may be empty. When receiving the random access preamble, the baseband apparatus obtains, based on the random access preamble, a corresponding TA value and a corresponding RAPID by detection, and fills the TA field and the RAPID field in the buffered second RAR message with the detected TA value and the detected RAPID. The second RAR message in which the TA field and the RAPID field are filled is the first RAR message.

Optionally, the baseband apparatus is further configured to send the first RAR message to the UE on a first frequency domain resource. The first frequency domain resource is a frequency domain resource allocated by the centralized control apparatus or the baseband apparatus.

In an example, the first frequency domain resource may be a frequency domain resource that is pre-allocated by the centralized control apparatus to the remote apparatus and that is used to transmit the RAR message. The centralized control apparatus does not occupy the first frequency domain resource in a service processing process.

To be specific, to ensure that the remote apparatus can properly allocate, without conflicting with a resource allocation process of the centralized control apparatus, a resource in a process of responding to the random access preamble, the centralized control apparatus may pre-allocate a fixed first frequency domain resource to the remote apparatus to send the RAR message, and the centralized control apparatus does not occupy the first frequency domain resource in the service processing process.

Further, to ensure accuracy of allocating the first frequency domain resource, the centralized control apparatus may collect statistics on frequency domain resources occupied by the RAR message in different time periods, and allocate the first frequency domain resource to the remote apparatus based on a statistical result. For example, because a quantity of UEs that send a first service request varies in different time periods, in other words, service load varies, frequency domain resources occupied by the RAR message that needs to be sent by the base station also vary. Therefore, the centralized control apparatus may semi-statically allocate, to the remote apparatus based on the foregoing statistical result, a frequency domain resource used to transmit the RAR message. In this way, a radio channel resource is used most efficiently.

In another example, the first frequency domain resource may be a resource allocated by the baseband apparatus.

The baseband apparatus may allocate the first frequency domain resource to the first RAR message by using the pre-deployed L2' module. Optionally, the baseband apparatus may allocate the first frequency domain resource to the first RAR message from a preset frequency domain resource. The preset frequency domain resource may be a frequency domain resource shared by the centralized control apparatus and the remote apparatus in the service processing process.

In a process of using the preset frequency domain resource, to avoid a resource allocation conflict and most efficiently use the radio channel resource, it may be set, according to the protocol, that the centralized control apparatus allocates a required frequency domain resource from one end of the preset frequency domain resource, and it may be set, according to the protocol, that the baseband apparatus allocates the first frequency domain resource from the other end of the preset frequency domain resource. The one end is a frequency domain start location or a frequency domain end location of the preset frequency domain resource, and the other end is a location opposite to the one end.

Optionally, the baseband apparatus is further configured to: receive the uplink scheduling transmission message sent by the UE, and send the contention resolution message to the UE based on the uplink scheduling transmission message. In other words, all of the Msg 1 to the Msg 4 in the random access procedure may be processed by using the remote apparatus. Therefore, random access performance of the base station is further ensured when the transmission latency between the remote apparatus and the centralized control apparatus is relatively long.

Optionally, in another embodiment, the Msg 3 and the Msg 4 in the random access procedure may also be processed by using the centralized control apparatus. In other words, the baseband apparatus is further configured to: receive the uplink scheduling transmission message sent by the UE, send the uplink scheduling transmission message to the centralized control apparatus, receive the contention resolution message sent by the centralized control apparatus, and send the contention resolution message to the UE.

Further, the foregoing UL grant that is in the RAR message and that is sent by the baseband apparatus to the UE, in other words, the scheduling resource information of the Msg 3 may also be obtained by the centralized control apparatus or the baseband apparatus through allocation. In addition, the UL grant may be allocated in a manner in which the first frequency domain resource is allocated.

For example, the first RAR message may carry information about a second frequency domain resource, and the second frequency domain resource is a frequency domain resource allocated by the centralized control apparatus or the baseband apparatus to the UE to send the Msg 3.

The second frequency domain resource may be a frequency domain resource that is pre-allocated by the centralized control apparatus and that is used to transmit the Msg 3. The centralized control apparatus does not occupy the second frequency domain resource in a service processing process. Alternatively, it may be set, according to a protocol, that the baseband apparatus allocates the second frequency domain resource from one end of a preset frequency domain resource, and the centralized control apparatus may allocate a frequency domain resource from the other end of the preset frequency domain resource when processing a service.

Further, to ensure accuracy of allocating the second frequency domain resource, the centralized control apparatus may collect statistics on frequency domain resources occupied by the Msg 3 in different time periods, and allocate the second frequency domain resource based on a statistical result. In this way, the centralized control apparatus may semi-statically allocate, based on service load in different time periods, the frequency domain resource used to transmit the Msg 3. Optionally, the centralized control apparatus may compute a sending frame number and a subframe number of the Msg 3 based on a RACH time sequence, and reserve a corresponding second frequency domain resource on a corresponding subframe number, to prevent the corresponding subframe number from being occupied by another service.

Further, when the Msg 3 and the Msg 4 are processed by using the centralized control apparatus, the Msg 3 needs to be demodulated by using the centralized control apparatus. Therefore, after completing resource allocation of the Msg3, the remote apparatus further needs to send the resource information of the Msg 3 to the centralized control apparatus, so that the centralized control apparatus correctly demodulates the Msg 3.

In the foregoing embodiment, the remote apparatus in the base station is provided. The remote apparatus includes not only the radio frequency apparatus, but also the baseband apparatus that is configured to perform partial or total physical layer protocol processing on the data of the UE and that is configured to respond to the random access preamble sent by the UE. Therefore, after receiving the random access preamble of the UE, the remote apparatus may directly respond to the random access preamble by using the baseband apparatus, and does not need to send the random access preamble to the centralized control apparatus, so that the centralized control apparatus responds to the random access preamble. In this way, the transmission latency between the remote apparatus and the centralized control apparatus may be avoided, and the remote apparatus returns the random access response to the UE in time.

It should be noted that a base station may further perform data transmission with UE. To be specific, the base station may send downlink data to the UE, or may receive uplink data sent by the UE. In a scenario in which the base station sends downlink data to the UE, the base station usually needs to have a HARQ retransmission mechanism. To be specific, after sending the downlink data to the UE, if a centralized control apparatus in the base station receives, within duration specified in a HARQ process, an ACK message or a NACK message returned by the UE, the centralized control apparatus determines, based on the received ACK message or the received NACK message, whether the downlink data needs to be retransmitted. In this way, HARQ retransmission of the downlink data is implemented. However, when the transmission latency between the centralized control apparatus and the remote apparatus is relatively long, the centralized control apparatus cannot receive, within the duration specified in the HARQ process, the ACK message or the NACK message returned by the UE. Consequently, the HARQ retransmission cannot be implemented based on a protocol requirement, thereby affecting data transmission efficiency and reliability.

To resolve a problem that the base station cannot implement the HARQ retransmission of the downlink data due to the relatively long transmission latency between the centralized control apparatus and the remote apparatus, an embodiment of the present invention provides a remote apparatus in a base station. The remote apparatus is connected to a centralized control apparatus, and the remote apparatus includes a radio frequency apparatus and a baseband apparatus. The baseband apparatus is configured to: buffer first downlink data; and after the centralized control apparatus sends the first downlink data by using the remote apparatus, if a NACK message is received, send the buffered first downlink data to the UE.

Further, after the centralized control apparatus sends the first downlink data by using the remote apparatus, if an ACK message is received, the baseband apparatus is further configured to release the buffered first downlink data.

In other words, by using the foregoing baseband apparatus, in a process in which the centralized control apparatus sends the first downlink data to the UE by using the remote apparatus, the remote apparatus may buffer the first downlink data, and after the centralized control apparatus sends the first downlink data to the UE by using the remote apparatus, if the remote apparatus receives the NACK message sent by the UE, the remote apparatus may obtain the buffered first downlink data, and send the first downlink data to the UE again; or if the remote apparatus receives the ACK message sent by the UE, the remote apparatus releases the buffered first downlink data.

In this embodiment of the present invention, a HARQ retransmission policy of the downlink data is optimized by using the remote apparatus. This effectively resolves a problem that spectrum efficiency significantly decreases because the HARQ retransmission cannot be implemented when the transmission latency between the remote apparatus and the centralized control apparatus is relatively long. Therefore, efficient and reliable transmission when the transmission latency between the remote apparatus and the centralized control apparatus is relatively long is implemented.

It should be noted that in a scenario in which UE sends uplink data to a base station, the UE usually has a HARQ retransmission mechanism, and generally, a centralized control apparatus in the base station demodulates and decodes the received uplink data, and sends an ACK message or a NACK message to the UE based on a decoding result. The ACK message is used to indicate that decoding of the uplink data succeeds, and instruct the UE to send new uplink data. The NACK message is used to indicate that the decoding of the uplink data fails, and instruct the UE to retransmit the uplink data. However, when a transmission latency between the centralized control apparatus and a remote apparatus is relatively long, in a process in which the base station performs uplink data transmission with the UE, the UE cannot receive in time the ACK message or the NACK message returned by the base station, and consequently, HARQ retransmission of the uplink data cannot be implemented.

To resolve a problem that the HARQ retransmission of the uplink data cannot be implemented when the transmission latency between the centralized control apparatus and the remote apparatus is relatively long, an embodiment of the present invention provides a remote apparatus in a base station. The remote apparatus is connected to a centralized control apparatus, and the remote apparatus includes a radio frequency apparatus and a baseband apparatus.

The baseband apparatus may use a relatively conservative scheduling and transmission policy for the uplink data, to avoid a bit error of the uplink data as much as possible. When determining that a bit error of the uplink data may occur, the baseband apparatus instructs the UE to retransmit the uplink data.

Optionally, the baseband apparatus is configured to: receive first uplink data sent by the UE; determine channel quality between the base station and the UE; and determine, based on the channel quality, whether the UE retransmits the first uplink data.

To be specific, the baseband apparatus may predict, based on a channel quality detection result, whether the first uplink data can be successfully decoded; determine, based on a prediction result, whether the UE retransmits the first uplink data; and then send an ACK message or a NACK message to the UE. When the detected channel quality is relatively good, the baseband apparatus may predict that the first uplink data can be successfully decoded, and determine that the UE does not need to retransmit the first uplink data. When the channel quality is relatively poor, the baseband apparatus may predict that the first uplink data cannot be successfully decoded, and determine that the UE needs to retransmit the first uplink data.

Optionally, the baseband apparatus may detect the channel quality between the base station and the UE based on a pilot signal or a sounding reference signal (SRS) sent by the UE.

Optionally, the baseband apparatus is configured to perform total physical layer protocol processing on data of the UE, and the baseband apparatus is further configured to: receive the first uplink data sent by the UE; decode the first uplink data; and determine, based on a decoding result, whether the UE retransmits the first uplink data.

The determining, based on a decoding result, whether the UE retransmits the first uplink data includes: if the decoding result indicates that decoding succeeds, determining that the UE does not need to retransmit the first uplink data; or if the decoding result indicates that decoding fails, determining that the UE needs to retransmit the first uplink data.

To be specific, after receiving the first uplink data sent by the UE, the remote apparatus may directly demodulate and decode the first uplink data by using the baseband apparatus to obtain the decoding result, then may determine, based on the accurate decoding result, whether the UE retransmits the first uplink data, and send the ACK message or the NACK message to the UE.

For example, the baseband apparatus may include an L1 module and a PHICH processing module. The baseband apparatus may demodulate and decode the first uplink data by using the L1 module, and send the NACK message or the ACK message to the UE by using the PHICH processing module.

Optionally, the baseband apparatus is further configured to receive scheduling resource information sent by the centralized control apparatus. The scheduling resource information is used to indicate information about a resource on which the UE sends second uplink data. If the baseband apparatus determines that the UE needs to retransmit the first uplink data, the baseband apparatus is further configured to send the NACK message to the UE; or if the baseband apparatus determines that the UE does not need to retransmit the first uplink data, the baseband apparatus is further configured to send the acknowledgement ACK message and the scheduling resource information to the UE, to instruct the UE to transmit the second uplink data on the resource indicated by the scheduling resource information.

In other words, when the baseband apparatus determines that the UE needs to retransmit the first uplink data, the baseband apparatus may not send the scheduling resource information to the UE, and sends the NACK message to the UE, to instruct the UE to retransmit the first uplink data on a scheduling resource of the first uplink data. However, the baseband apparatus sends the scheduling resource information to the UE only when determining that the UE does not need to retransmit the first uplink data, so that the UE sends new uplink data on the scheduling resource. In this way, a scheduling resource of the uplink data may be saved.

In this embodiment of the present invention, a HARQ retransmission policy of the uplink data is optimized by using the remote apparatus. This effectively resolves a problem that spectrum efficiency significantly decreases because the HARQ retransmission of the uplink data cannot be implemented when the transmission latency between the remote apparatus and the centralized control apparatus is relatively long. Therefore, efficient and reliable transmission when the transmission latency between the remote apparatus and the centralized control apparatus is relatively long is implemented.

In another embodiment, to resolve a problem that HARQ retransmission of downlink data cannot be implemented when a transmission latency between a centralized control apparatus and a remote apparatus is relatively long, a centralized control apparatus in a base station is further provided. The centralized control apparatus is connected to a remote apparatus.

The centralized control apparatus is configured to send first downlink data to the UE by using the remote apparatus. If no ACK message or NACK message sent by the UE is received within a preset time interval, the centralized control apparatus is further configured to send second downlink data to the UE by using the remote apparatus; or if a NACK message sent by the UE is received, the centralized control apparatus is further configured to retransmit the first downlink data to the UE by using the remote apparatus.

The second downlink data is downlink data other than the first downlink data in the downlink data sent to the UE, in other words, new downlink data.

Optionally, the preset time interval may be a time interval specified in a HARQ process, that is, a time interval, specified in the HARQ process, that is after the first downlink data is sent to the UE by using the remote apparatus and that is between a moment at which the ACK message or the NACK message of the UE needs to be received at latest and a moment at which the first downlink data is sent.

For example, in a process of performing downlink data transmission with the UE, the centralized control apparatus may send the first downlink data to the UE by using the remote apparatus. After sending the first downlink data to the UE by using the remote apparatus, if duration between a current moment and the moment at which the first downlink data is sent reaches the duration specified in the HARQ process, and the centralized control apparatus does not receive the ACK message or the NACK message sent by the UE, the centralized control apparatus may directly send the second downlink data to the UE by using the remote apparatus. After sending the second downlink data to the UE, if the NACK message sent by the UE is received, the centralized control apparatus retransmits the first downlink data to the UE; or if the NACK message sent by the UE is not received, the centralized control apparatus does not retransmit the first downlink data to the UE.

In a related technology, after sending the first downlink data, if the duration between the current moment and the moment at which the first downlink data is sent reaches the duration specified in the HARQ process, in other words, if the centralized control apparatus does not receive a transmission response to the first downlink data when the current moment reaches a HARQ time sequence, the centralized control apparatus cannot determine whether to send new downlink data or to retransmit the first downlink data at the HARQ time sequence. Consequently, the HARQ time sequence cannot be used. In this embodiment of the present invention, to properly use the HARQ time sequence, if the current moment reaches the HARQ time sequence, and the centralized control apparatus does not receive the transmission response of the first downlink data, retransmission may be not considered, and the centralized control apparatus directly sends the new downlink data to the UE by using the remote apparatus.

The duration specified in the HARQ process is generally 8 ms. For example, the HARQ time sequence is generally the eighth TTI after a transmission time interval (TTI) in which the first downlink data is located.

Further, the centralized control apparatus is further configured to: buffer the first downlink data in a process of sending the first downlink data by using the remote apparatus; and if the NACK message is received, send the buffered first downlink data to the UE by using the remote apparatus; or if the ACK message is received, release the buffered first downlink data.

In another embodiment, to resolve a problem that HARQ retransmission of uplink data cannot be implemented when a transmission latency between a centralized control apparatus and a remote apparatus is relatively long, a centralized control apparatus in a base station is further provided. The centralized control apparatus is connected to a remote apparatus.

The centralized control apparatus may use a relatively conservative scheduling and transmission policy for the uplink data, to avoid a bit error of the uplink data as much as possible. When determining that a bit error of the uplink data may occur, the centralized control apparatus instructs UE to retransmit the uplink data.

Optionally, the centralized control apparatus is configured to: receive first uplink data sent by the UE; determine channel quality between the base station and the UE; and determine, based on the channel quality, whether the UE retransmits the first uplink data.

For example, if the channel quality between the base station and the UE is relatively poor, it is predicted that a probability of successful first transmission of the downlink data of the UE is very low. In this case, the centralized control apparatus may first perform scheduling by using a relatively high MCS, to ensure that first transmission of the downlink data definitely fails, then enforces retransmission of the downlink data, to ensure that no bit error occurs in the retransmission. In this way, correctness of data transmission is ensured by the retransmission.

Optionally, the centralized control apparatus is configured to determine a path loss between the base station and the UE; and determine, based on the path loss, whether the UE needs to retransmit the first uplink data after sending the first uplink data.

The centralized control apparatus may determine the path loss between the base station and the UE based on a distance between the base station and the UE. When the path loss is relatively large, the centralized control apparatus determines that the UE needs to retransmit the first uplink data. When the path loss is relatively small, the centralized control apparatus determines that the UE does not need to retransmit the first uplink data.

For example, in a process of performing uplink data transmission with the UE, the centralized control apparatus may determine the distance between the base station and the UE, determine the path loss between the base station and the UE based on the distance, and when the path loss is greater than a preset path loss threshold, determine that the UE needs to retransmit the first uplink data.

In other words, the centralized control apparatus may determine, based on the path loss between the base station and the UE, a probability that the bit error of the uplink data sent by the UE. When the path loss is greater than the preset path loss threshold, it indicates that the channel quality between the base station and the UE is relatively poor, and the probability that the bit error of the uplink data occurs is relatively large. Therefore, in this case, the centralized control apparatus may instruct the UE to retransmit the uplink data, to reduce a bit error rate of the uplink data.

The centralized control apparatus may determine the distance between the the base station and the UE based on RSRP measurement of the UE. By using a transmission time interval bounding (TTI-Bounding) technology, the centralized control apparatus may instruct the UE to retransmit the uplink data for a plurality of times, or may instruct the UE to perform retransmission for one time. This is not limited in this embodiment of the present invention.

Optionally, the centralized control apparatus is further configured to determine, based on a historical channel quality detection result between the base station and the UE and a historical CRC result of the uplink data of the UE, whether the UE needs to retransmit the first uplink data after sending the first uplink data.

For example, in the process of performing uplink data transmission with the UE, the centralized control apparatus may predict, based on the historical channel quality detection result between the base station and the UE and the historical cyclic redundancy check result of the uplink data of the UE, whether the first uplink data sent by the UE can be successfully decoded, and determine, based on a prediction result, whether the UE needs to retransmit the first uplink data after sending the first uplink data. In other words, the centralized control apparatus may predict, based on the historical channel quality detection result between the base station and the UE and the historical CRC result of uplink data, a success rate of decoding the first uplink data currently sent by the UE, and then determine, based on a prediction result, whether the first uplink data needs to be retransmitted.

Further, if the centralized control apparatus determines that the UE needs to retransmit the first uplink data, the centralized control apparatus is further configured to send a NACK message to the UE. If the centralized control apparatus determines that the UE does not need to retransmit the first uplink data, the centralized control apparatus is further configured to send an ACK message and scheduling resource information to the UE, to instruct the UE to transmit the second uplink data on a resource indicated by the scheduling resource information.

For example, before the centralized control apparatus sends, to the UE, the ACK message or the NACK message specific to the first uplink data, the centralized control apparatus may schedule, for the UE, a resource used to send the second uplink data, and obtain the scheduling resource information. When the prediction result indicates that decoding of the first uplink data fails, the centralized control apparatus may send the NACK message to the UE, and does not send the scheduling resource information to the UE. When the prediction result indicates that the decoding of the first uplink data succeeds, the centralized control apparatus may send the ACK message and the scheduling resource information to the UE, to instruct the UE to transmit the second uplink data on the resource indicated by the scheduling resource information. In this way, a scheduling resource of the uplink data may be saved.

Optionally, the centralized control apparatus is further configured to determine, based on a transmission latency, whether the remote apparatus responds to a random access preamble.

The transmission latency may be a transmission latency between the centralized control apparatus and the remote apparatus. To be specific, the centralized control apparatus may determine the transmission latency between the centralized control apparatus and the remote apparatus, and determine, based on the transmission latency, whether the remote apparatus responds to the random access preamble.

Based on the transmission latency between the centralized control apparatus and the remote apparatus, if a RAR message can be returned to the UE in time when the centralized control apparatus responds to the random access preamble sent by the UE, it may be determined that the remote apparatus does not need to respond to the random access preamble. Based on the transmission latency between the centralized control apparatus and the remote apparatus, if the RAR message cannot be returned to the UE in time when the centralized control apparatus responds to the random access preamble sent by the UE, it may be determined that the remote apparatus needs to respond to the random access preamble.

In an example, the centralized control apparatus may include a function control switch, and the function control switch is configured to control enabling or disabling of a function of responding, by the remote apparatus, to the random access preamble. When the centralized control apparatus determines that the remote apparatus needs to respond to the random access preamble, the function control switch may be turned on, to enable the function of responding, by the remote apparatus, to the random access preamble. When the centralized control apparatus determines that the remote apparatus does not need to respond to the random access preamble, the function control switch may be turned off, to disable the function of responding, by the remote apparatus, to the random access preamble.

By determining, based on the transmission latency, whether the remote apparatus responds to the random access preamble, flexibility and accuracy of responding, by the base station, to the random access preamble are improved.

In this embodiment of the present invention, the scheduling and transmission policy of the uplink data is optimized. This effectively resolves a problem that spectrum efficiency significantly decreases because the HARQ retransmission of the uplink data cannot be implemented when the transmission latency between the remote apparatus and the centralized control apparatus is relatively long, thereby implementing efficient and reliable transmission when the transmission latency between the remote apparatus and the centralized control apparatus is relatively long.

The foregoing embodiments related to the HARQ mechanism in this application may be combined with the foregoing embodiments related to random access, or the HARQ mechanism may be separately executed. This is not limited in this application.

Figure 7:
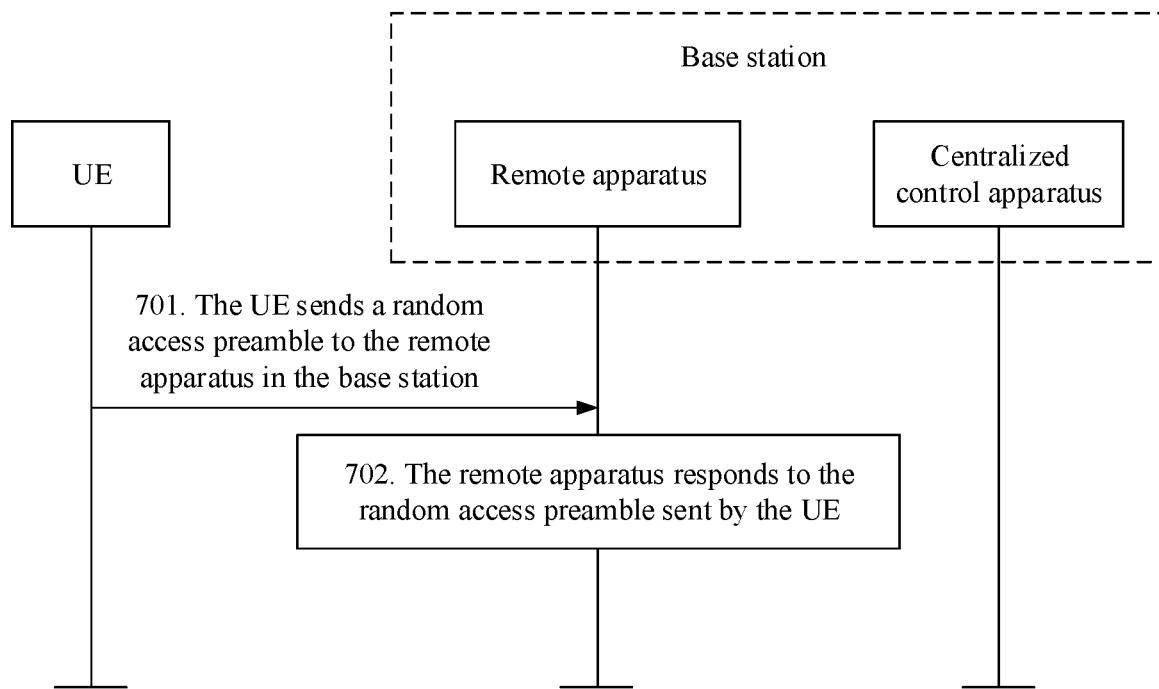
FIG. 7 is a flowchart of a random access method according to an embodiment of the present invention.

In another embodiment, a random access method is further provided. FIG. 7 is a flowchart of the random access method according to this embodiment of the present invention. The method is applied to a base station. The base station includes a centralized control apparatus and a remote apparatus connected to the centralized control apparatus. Referring to FIG. 7, the random access method includes the following steps.

Step 701: UE sends a random access preamble to the remote apparatus in the base station.

Step 702: The remote apparatus responds to the random access preamble sent by the UE.

The responding, by the remote apparatus, to the random access preamble sent by the UE may include: sending, by the remote apparatus, a first random access response RAR message to the UE. Alternatively, the remote apparatus may receive a second RAR message from the centralized control apparatus. Correspondingly, the responding, by the remote apparatus, to the random access preamble sent by the UE may include: generating, by the remote apparatus, a first RAR message based on the second RAR message; and sending, by the remote apparatus, the first RAR message to the UE.

When sending the first RAR message to the UE, the remote apparatus may send the first RAR message to the UE on a first frequency domain resource. The first frequency domain resource is a frequency domain resource allocated by the centralized control apparatus or a baseband apparatus.

After sending the first RAR message to the UE, the remote apparatus may further receive an uplink scheduling transmission message sent by the UE, and send a contention resolution message to the UE based on the uplink scheduling transmission message. Alternatively, the remote apparatus may further receive an uplink scheduling transmission message sent by the UE, send the uplink scheduling transmission message to the centralized control apparatus, receive a contention resolution message sent by the centralized control apparatus, and send the contention resolution message to the UE.

After random access of the UE is completed, the base station may further perform data transmission with the UE. To be specific, the base station may receive uplink data sent by the UE, or may send downlink data to the UE.

In a process in which the base station performs uplink data transmission with the UE, the remote apparatus may buffer first downlink data. After the centralized control apparatus sends the first downlink data by using the remote apparatus, if the remote apparatus receives a negative acknowledgement NACK message, the remote apparatus sends the buffered first downlink data to the UE.

In a process in which the base station performs downlink data transmission with the UE, the remote apparatus may further receive first uplink data sent by the UE, determine channel quality between the base station and the UE; and determine, based on the channel quality, whether the UE retransmits the first uplink data. Alternatively, the baseband apparatus in the remote apparatus may be configured to perform total physical layer protocol processing on data of the UE, and the remote apparatus may further receive first uplink data sent by the UE, decode the first uplink data, and determine, based on a decoding result, whether the UE retransmits the first uplink data.

Before determining whether the UE retransmits the first uplink data, the remote apparatus may further receive scheduling resource information sent by the centralized control apparatus. The scheduling resource information is used to indicate information about a resource on which the UE sends second uplink data. If the remote apparatus determines that the UE needs to retransmit the first uplink data, the remote apparatus sends a NACK message to the UE; or if the remote apparatus determines that the UE does not need to retransmit the first uplink data, the remote apparatus sends an acknowledgement ACK message and the scheduling resource information to the UE, to instruct the UE to transmit the second uplink data on the resource indicated by the scheduling resource information.

In the process in which the base station performs uplink data transmission with the UE, the centralized control apparatus may send the first downlink data to the UE by using the remote apparatus. If no ACK message or NACK message sent by the UE is received within a preset time interval, the centralized control apparatus sends second downlink data to the UE by using the remote apparatus. If the NACK message sent by the UE is received, the centralized control apparatus retransmits the first downlink data to the UE by using the remote apparatus.

In the process of performing downlink data transmission with the UE, the centralized control apparatus may further determine a path loss between the base station and the UE. The centralized controller determines, based on the path loss, whether the UE needs to retransmit the first uplink data after sending the first uplink data. Alternatively, the centralized control apparatus may further determine, based on a historical channel quality detection result between the base station and the UE and a historical cyclic redundancy check CRC result of uplink data of the UE, whether the UE needs to retransmit the first uplink data after sending the first uplink data.

After the determining whether the UE needs to retransmit the first uplink data, the method further includes: If the centralized control apparatus determines that the UE needs to retransmit the first uplink data, the centralized control apparatus further sends the NACK message to the UE; or if the centralized control apparatus determines that the UE does not need to retransmit the first uplink data, the centralized control apparatus may send the ACK message and the scheduling resource information to the UE, to instruct the UE to transmit the second uplink data on the resource indicated by the scheduling resource information.

Further, before the remote apparatus responds to the random access preamble sent by the UE, the centralized control apparatus may further determine, based on a transmission latency, whether the remote apparatus responds to the random access preamble.

It should be noted that in this embodiment of the present invention, the random access method is simply described. For a specific implementation process, refer to related descriptions in the foregoing embodiments of the remote apparatus or the embodiments of the centralized control apparatus. Details are not described herein again in this embodiment of the present invention.

In another embodiment, a computer readable storage medium and a computer program product are further provided.

The computer readable storage medium stores an instruction. When the instruction is run on a computer, the computer is enabled to perform the steps related to the foregoing embodiments.

When the computer program product that includes the instruction is run on the computer, the computer is enabled to perform the steps related to the foregoing embodiments.

Figure 8:
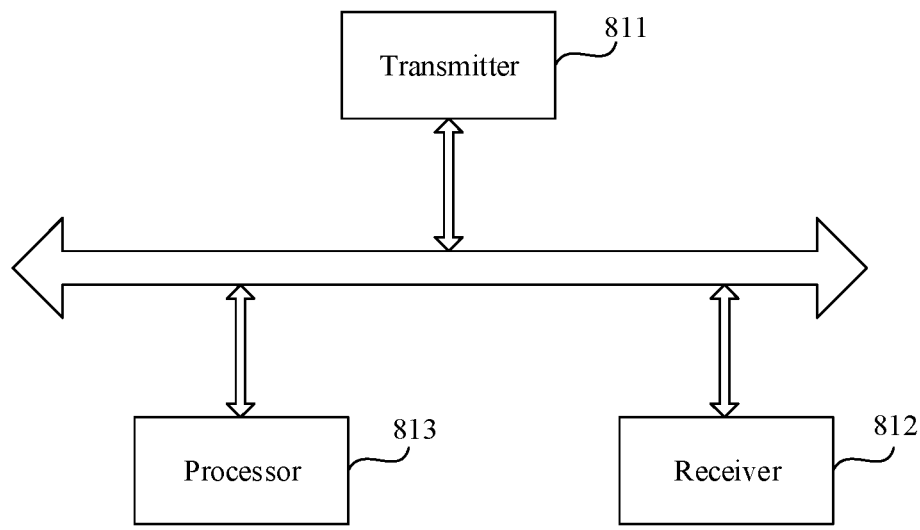
FIG. 8 is a simplified schematic diagram of an embodiment of a structure of a remote apparatus in the base station in the foregoing embodiments.

FIG. 8 is a simplified schematic diagram of an embodiment of a structure of a remote apparatus in the base station in the foregoing embodiments. The remote apparatus includes a transmitter 811, a receiver 812, and a processor 813.

The transmitter 811 and the receiver 812 are configured to: support the remote apparatus in transmitting information to and receiving information from the UE or the centralized control apparatus in the foregoing embodiments; and support radio communication between the UE and another UE. For example, the remote apparatus may receive, by using the receiver 812, a random access preamble or uplink data sent by the UE, or send a RAR message or downlink data to the UE by using the transmitter 811. The processor 813 is a control center of the remote apparatus, and the processor 813 may perform various functions used to communicate with the UE or the centralized control apparatus. The processor 813 further performs a processing process of the remote apparatus in the foregoing embodiments and/or another process of the technology described in this application.

It can be understood that, FIG. 8 shows only a simplified design of the remote apparatus. In actual application, the remote apparatus may include any quantity of transmitters, receivers, processors, and the like. All remote apparatuses that may implement this application fall within the protection scope of this application.

Figure 9:
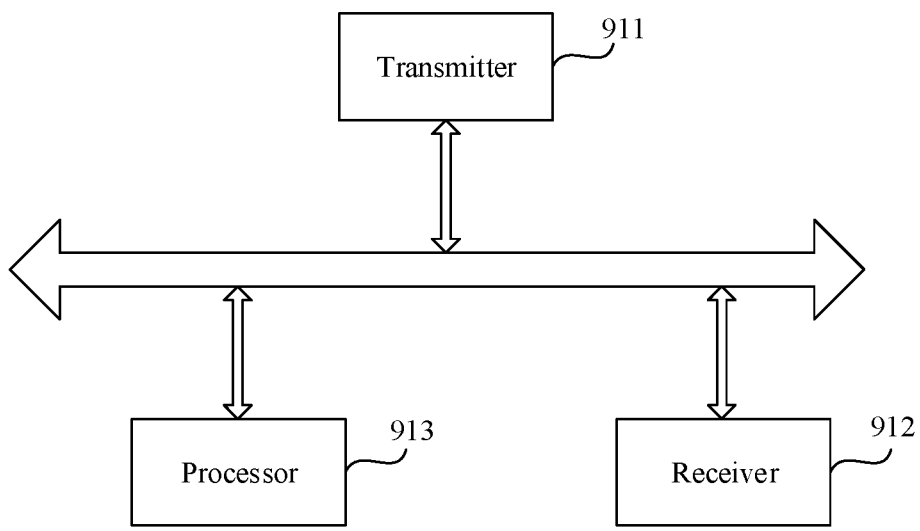
FIG. 9 is a simplified schematic diagram of an embodiment of a structure of a centralized control apparatus in the base station in the foregoing embodiments.

FIG. 9 is a simplified schematic diagram of an embodiment of a structure of a centralized control apparatus in the base station in the foregoing embodiments. The centralized control apparatus includes a transmitter 911, a receiver 912, and a processor 913.

The transmitter 911 and the receiver 912 are configured to: support the centralized control apparatus in transmitting information to and receiving information from the remote apparatus or the UE in the foregoing embodiments; and support radio communication between the UE and another UE. For example, the centralized control apparatus may receive, by using the receiver 912, uplink data of the UE forwarded by the remote apparatus, or send downlink data to the UE by using the transmitter 911. The processor 913 is a control center of the centralized control apparatus, and the processor 913 may perform various functions used to communicate with the UE or the remote apparatus, and process data of the UE that accesses the base station. The processor 913 further performs a processing process of the centralized control apparatus in the foregoing embodiments and/or another process of the technology described in this application.

It can be understood that, FIG. 9 shows only a simplified design of the centralized control apparatus. In actual application, the centralized control apparatus may include any quantity of transmitters, receivers, processors, and the like. All centralized control apparatuses that may implement this application fall within the protection scope of this application.

Method or algorithm steps described in combination with the content disclosed in this application may be implemented by hardware, or may be implemented by a processor by executing a software instruction. The software instruction may be formed by a corresponding software module. The software module may be located in a random access memory (RAM) memory, a flash memory, a read-only memory (ROM) memory, an erasable programmable ROM (EPROM) memory, an electrically erasable programmable ROM (EEPROM) memory, a register, a hard disk, a removable hard disk, a compact disk ROM (CD-ROM), or a storage medium of any other form known in the art. For example, a storage medium is coupled to a processor, so that the processor can read information from the storage medium or write information into the storage medium. Certainly, the storage medium may be a component of the processor. The processor and the storage medium may be located in the application-specific integrated circuit (ASIC). In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A remote apparatus in a base station, wherein the base station comprises a centralized control apparatus communicatively coupled to the remote apparatus, wherein the centralized control apparatus is configured to process data of user equipment (UE) that accesses the base station and send the data of the UE that is processed to the remote apparatus to be sent to the UE by using the remote apparatus, or the data of the UE is received by the remote apparatus from the UE and is sent to the centralized control apparatus for processing, the remote apparatus comprising:
   a radio frequency apparatus; and
   a baseband apparatus, wherein the baseband apparatus is configured to: perform partial or total physical layer protocol processing on the data of the UE, and respond to a random access preamble sent by the UE, and wherein the baseband apparatus is further configured to:
   receive a second random access response (RAR) message from the centralized control apparatus; and
   generate a first RAR message based on the second RAR message, and send the first RAR message to the UE.

2. The remote apparatus according to claim 1, wherein the baseband apparatus is further configured to: receive an uplink scheduling transmission message sent by the UE, and send a contention resolution message to the UE based on the uplink scheduling transmission message.

3. The remote apparatus according to claim 1, wherein the baseband apparatus is further configured to:
   receive an uplink scheduling transmission message sent by the UE,
   send the uplink scheduling transmission message to the centralized control apparatus,
   receive a contention resolution message sent by the centralized control apparatus, and
   send the contention resolution message to the UE.

4. The remote apparatus according to claim 1, wherein the baseband apparatus is further configured to:
   buffer first downlink data; and
   after the centralized control apparatus sends the first downlink data by using the remote apparatus, when a negative acknowledgement NACK message is received, send the buffered first downlink data to the UE.

5. The remote apparatus according to claim 1, wherein the baseband apparatus is further configured to receive first uplink data sent by the UE; and the baseband apparatus is further configured to: determine channel quality between the base station and the UE, and determine, based on the channel quality, whether the UE retransmits the first uplink data.

6. The remote apparatus according to claim 1, wherein the baseband apparatus is configured to perform total physical layer protocol processing on the data of the UE, and the baseband apparatus is further configured to: receive first uplink data sent by the UE, decode the first uplink data, and determine, based on a decoding result, whether the UE retransmits the first uplink data.

7. A base station, comprising:
   a centralized control apparatus; and
   a remote apparatus communicatively coupled with the centralized control apparatus, and
   wherein the centralized control apparatus is configured to process data of user equipment (UE) that accesses the base station and send the data of the UE that is processed to the remote apparatus to be sent to the UE by using the remote apparatus, or the data of the UE is received by the remote apparatus from the UE and is sent to the centralized control apparatus for processing, and
   wherein the remote apparatus is configured to receive a second random access response (RAR) message from the centralized control apparatus, and respond to a random access preamble sent by the UE by: generating a first RAR message based on the second RAR message, and sending the first RAR message to the UE.

8. The base station according to claim 7, wherein the centralized control apparatus is further configured to send first downlink data to the UE using the remote apparatus; and
   when no acknowledgement (ACK) message or negative acknowledgement (NACK) message sent by the UE is received within a preset time interval, the centralized control apparatus is further configured to send second downlink data to the UE using the remote apparatus; or
   when a NACK message sent by the UE is received, the centralized control apparatus is further configured to retransmit the first downlink data to the UE using the remote apparatus.

9. The base station according to claim 7, wherein the centralized control apparatus is further configured to:
   determine a path loss between the base station and the UE; and
   determine, based on the path loss, whether the UE is to retransmit first uplink data after sending the first uplink data.

10. The base station according to claim 7, wherein the centralized control apparatus is further configured to determine, based on a historical channel quality detection result between the base station and the UE and a historical cyclic redundancy check (CRC) result of uplink data of the UE, whether the UE is to retransmit first uplink data after sending the first uplink data.

11. The base station according to claim 9, wherein:
   when the centralized control apparatus determines that the UE is to retransmit the first uplink data, the centralized control apparatus is further configured to send a NACK message to the UE; or
   when the centralized control apparatus determines that the UE is not to retransmit the first uplink data, the centralized control apparatus is further configured to send an acknowledgement (ACK) message and scheduling resource information to the UE, to instruct the UE to transmit second uplink data on a resource indicated by the scheduling resource information.

12. The base station according to claim 7, wherein the centralized control apparatus is further configured to determine, based on a transmission latency, whether the remote apparatus responds to a random access preamble.

13. A random access method, wherein the method is applied to a base station, the base station comprising a centralized control apparatus and a remote apparatus communicatively coupled with the centralized control apparatus, the remote apparatus comprises a radio frequency apparatus and a baseband apparatus, the baseband apparatus is configured to perform partial or total physical layer protocol processing on data of UE, and the method comprises:
receiving, by the remote apparatus, a second random access response (RAR) message from the centralized control apparatus;
responding, by the remote apparatus, to a random access preamble sent by the UE comprising:
generating, by the remote apparatus, a first RAR message based on the second RAR message, and
sending, by the remote apparatus, the first RAR message to the UE.

14. The method according to claim 13, wherein the method further comprises:
receiving, by the remote apparatus, an uplink scheduling transmission message sent by the UE; and
sending, by the remote apparatus, a contention resolution message to the UE based on the uplink scheduling transmission message.

15. The remote apparatus according to claim 1, wherein the baseband apparatus is configured to send the first RAR message to the UE on a first frequency domain resource, wherein
the first frequency domain resource is a frequency domain resource allocated by the centralized control apparatus or the baseband apparatus.

16. The remote apparatus according to claim 5, wherein the baseband apparatus is further configured to receive scheduling resource information sent by the centralized control apparatus, and wherein the scheduling resource information indicates information about a resource on which the UE sends second uplink data; and
when the baseband apparatus determines that the UE is to retransmit the first uplink data, the baseband apparatus is further configured to send a negative acknowledgment (NACK) message to the UE; and
when the baseband apparatus determines that the UE is not to retransmit the first uplink data, the baseband apparatus is further configured to send an acknowledgement (ACK) message and the scheduling resource information to the UE, to instruct the UE to transmit the second uplink data on the resource indicated by the scheduling resource information.

* * * * *